Figure 1:
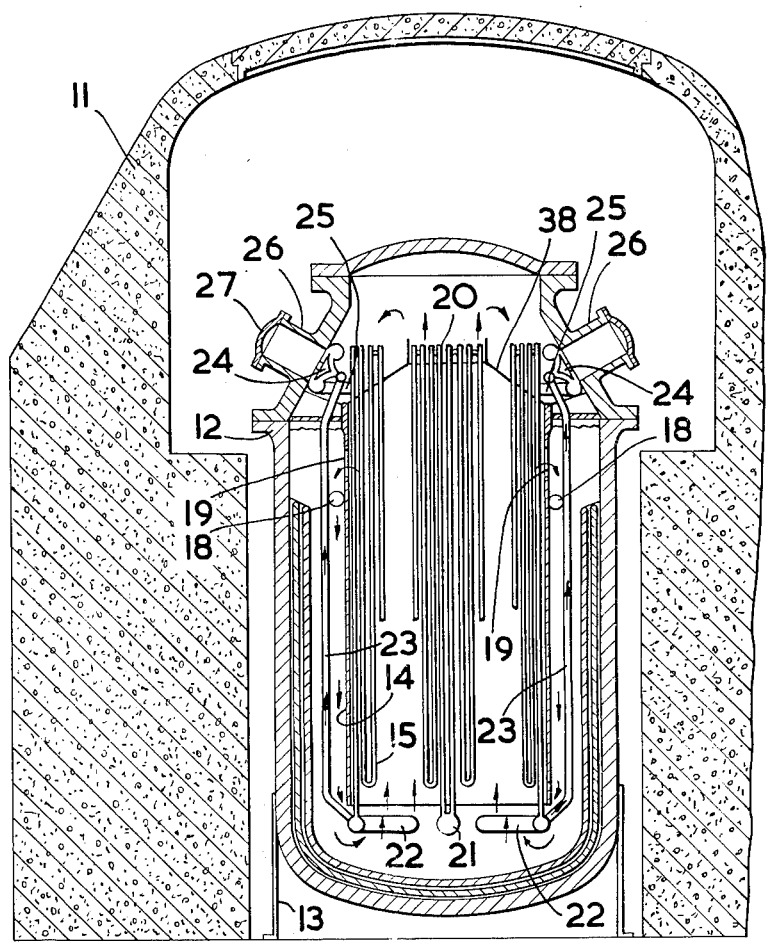

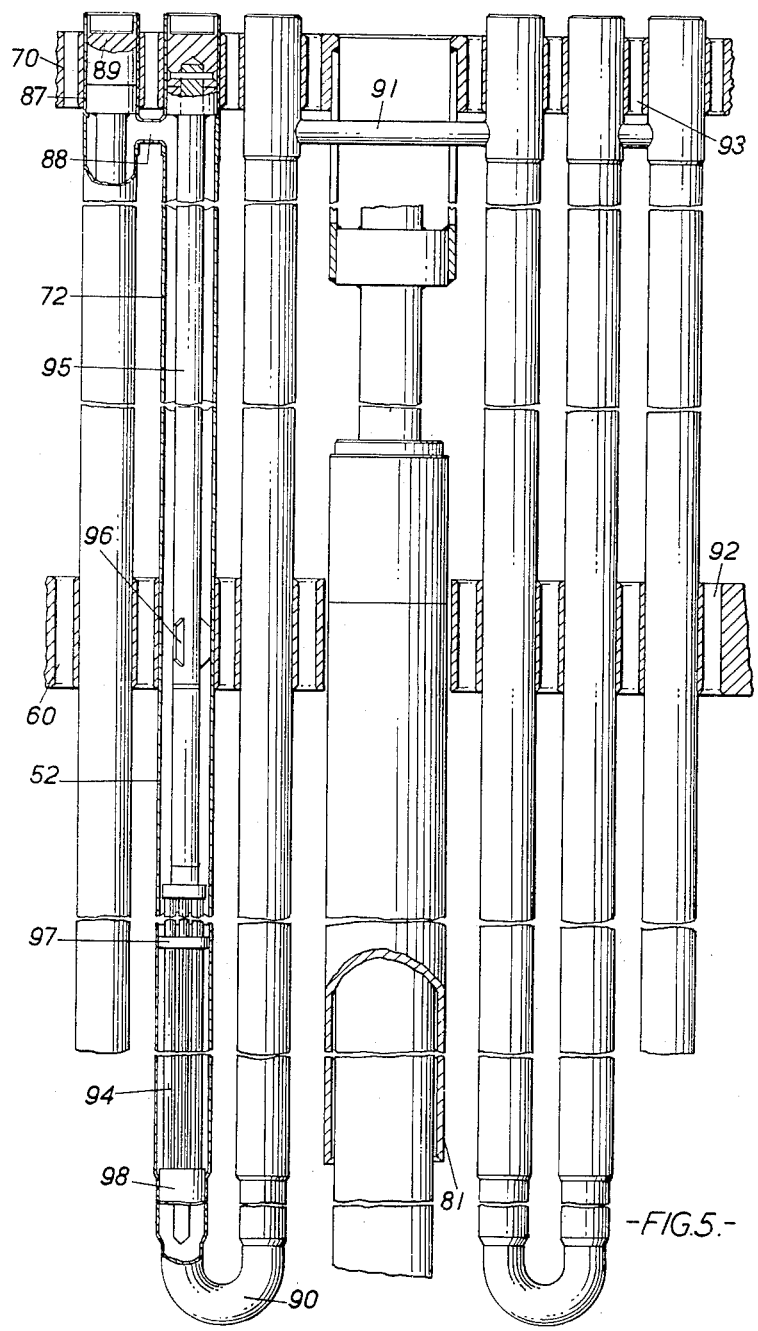

3,212,985
BOILING WATER NUCLEAR REACTOR OPERATING WITH PRIMARY AND SECONDARY COOLANT
Stanley Hackney, Fearnhead, near Warrington, England, assignor to United Kingdom Atomic Energy Authority, London, England
Filed Nov. 19, 1962, Ser. No. 238,438
Claims priority, application Great Britain, July 15, 1960, 24,720/60; Jan. 22, 1962, 2,334/62; July 5, 1962, 25,786/62
18 Claims. (Cl. 176—53)

The present invention relates to heterogeneous nuclear reactors wherein heat is transferred from fuel elements in a reactor core to a reactor coolant flowing through the core and is a continuation-in-part of U.S. patent application Serial No. 123,164, filed July 11, 1961, and now abandoned. More particularly, the invention is applicable to the reactor disclosed in my earlier copending U.S. patent application Serial No. 113,734, filed May 31, 1961 in which a fluid heat transfer medium hereinafter referred to as the primary coolant is employed as an intermediary between the fuel elements and the reactor coolant hereinafter referred to as the secondary coolant; in this reactor the fuel elements are housed in fuel tubes filled with primary coolant.

One function of the primary coolant is to abstract heat from the fuel elements and to deliver it to the secondary coolant. Basically this heat transfer takes place by thermal conduction through the primary coolant. The rate at which this heat transfer can take place is limited, however, by the thermal conductivity of the primary coolant and it is found that this limited rate of heat transfer does not match the optimum rate at which the fuel elements can produce heat. It is necessary, therefore, to operate the reactor with fuel elements at less than their optimum rating unless some method of increasing the heat transfer rate can be devised. The conventional method of increasing a heat transfer rate is to increase the area across which heat is transferred. Conceivably this could be done by means of fins applied internally and externally of the fuel tubes; however, heat transfer through these fins would be limited by their thermal conductivity and, accordingly, the heat transfer rate would not be greatly increased. Alternatively, the heat transfer area could be increased by extending the length of the fuel elements; however, this has the overriding disadvantage that it increases the volume of the core with a consequent loss of neutron economy.

A second function of the primary coolant may be to provide a substantially constant degree of neutron moderation in the reactor core. For this purpose the primary coolant should be a neutron-moderating substance. It is to be understood that by a neutron-moderating substance is meant a substance having a moderating ratio greater than 10, this ratio being defined as the ratio of the neutron slowing down power of the substance to its absorption cross section, namely $$\frac{e\Sigma s}{\Sigma a}$$

where $e$ is the average logarithmic energy decrement per neutron collision in the substance, $\Sigma s$ is the macroscopic scattering cross section of the substance for epithermal neutrons and $\Sigma a$ is the macroscopic absorption cross section of the substance.

The present invention provides a nuclear reactor comprising fuel elements, fuel tubes housing the fuel elements, a liquid neutron-moderating primary coolant within the fuel tubes, a secondary coolant for passage outside the fuel tubes in heat transfer relationship through the tubes with the primary coolant therein, an unfuelled extension tube connected in series with each fuel tube also exposed to the secondary coolant for heat transfer between primary coolant in the extension tube and the secondary coolant and end connections to each fuel tube and its associated extension tube for series flow of primary coolant therethrough. Preferably the reactor uses water coolants, the primary coolant being pressurised water and the secondary coolant being boiling water. Furthermore it is preferred that the fuel tubes and extension tubes should be so connected as to define a circulation path for the primary coolant which comprises fuelled sections alternating with unfuelled sections in which the primary coolant is cooled by heat transfer to the secondary coolant so that, in passage through the fuelled sections, the primary coolant can take more heat from the fuel elements than is transferred from the fuelled sections to the secondary coolant whilst in passage through the unfuelled sections the primary coolant is cooled in readiness for passage through the fuelled sections.

In one embodiment of the invention a nuclear reactor comprises fuel elements, fuel tubes housing the fuel elements, a primary coolant within the fuel tubes, a secondary coolant for flow unidirectionally outside the fuel tubes in heat transfer relationship with the primary coolant therein, an unfuelled extension tube connected in series with each fuel tube also exposed to the secondary coolant for heat transfer between the primary coolant in the extension tube and the secondary coolant, connections between adjacent extension tubes and between adjacent fuel tubes to provide a circulation path for the primary coolant to flow through one fuel tube and its associated extension tube in a similar direction to the flow of the secondary coolant and then to flow through an adjacent extension tube and its associated fuel tube in a direction opposed to the flow of secondary coolant, and modifications to the extension tubes whereby heat transfer between the primary coolant in the extension tubes and the secondary coolant is reduced where the fluids are flowing in similar directions and increased where the fluids are flowing in opposite directions. Modifications to the extension tubes to increase heat transfer between primary coolant within them and secondary coolant may include extending the surface of the extension tube wall and increasing the speed of the primary coolant in contact with the extension tube wall; modifications to the extension tubes to decrease this heat transfer may include heat insulation of the extension tube wall and establishing laminar flow of the primary coolant in contact with the extension tube wall at a reduced speed. This embodiment of the invention has particular application to a nuclear reactor in which superheated steam is produced; thus in such a reactor it could be arranged that the secondary coolant in which the fuel tubes are immersed is in the form of boiling water whereas the secondary coolant in which the extension tubes are immersed is in the form of steam.

In another embodiment of the invention a boiling water nuclear reactor comprises fuel elements, fuel tubes housing the fuel elements, a primary coolant in the form of pressurised water within the fuel tubes, a secondary coolant in the form of boiling water for flow unidirectionally outside the fuel tubes in heat transfer relationship with the primary coolant therein, an unfuelled extension tube connected in series with each fuel tube also exposed to the secondary coolant for heat transfer between the primary coolant in the extension tube and the secondary coolant, and connections between adjacent extension tubes and between adjacent fuel tubes to provide a circulation path for the primary coolant to flow through one fuel tube and its associated extension tube in a similar direction to the flow of the secondary coolant and then to flow through an adjacent extension tube and its associated fuel tube in a direction opposed to the flow of the secondary coolant, the extension tubes having similar heat transfer properties so that the primary coolant is cooled in the extension tubes by heat transfer with the secondary coolant first while the primary coolant is flowing in a similar direction to the secondary coolant and then while the primary coolant is flowing in a direction opposed to the flow of the secondary coolant.

Figure 2:
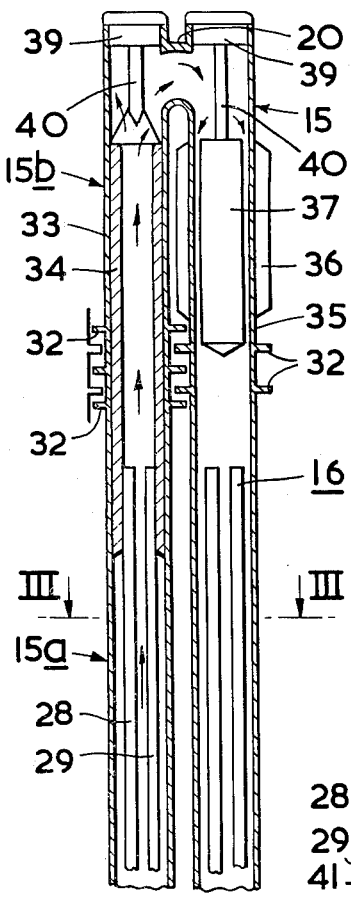
Figure 3:
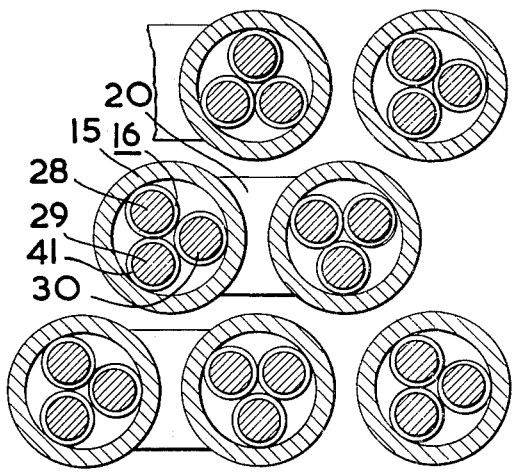
Figure 4:
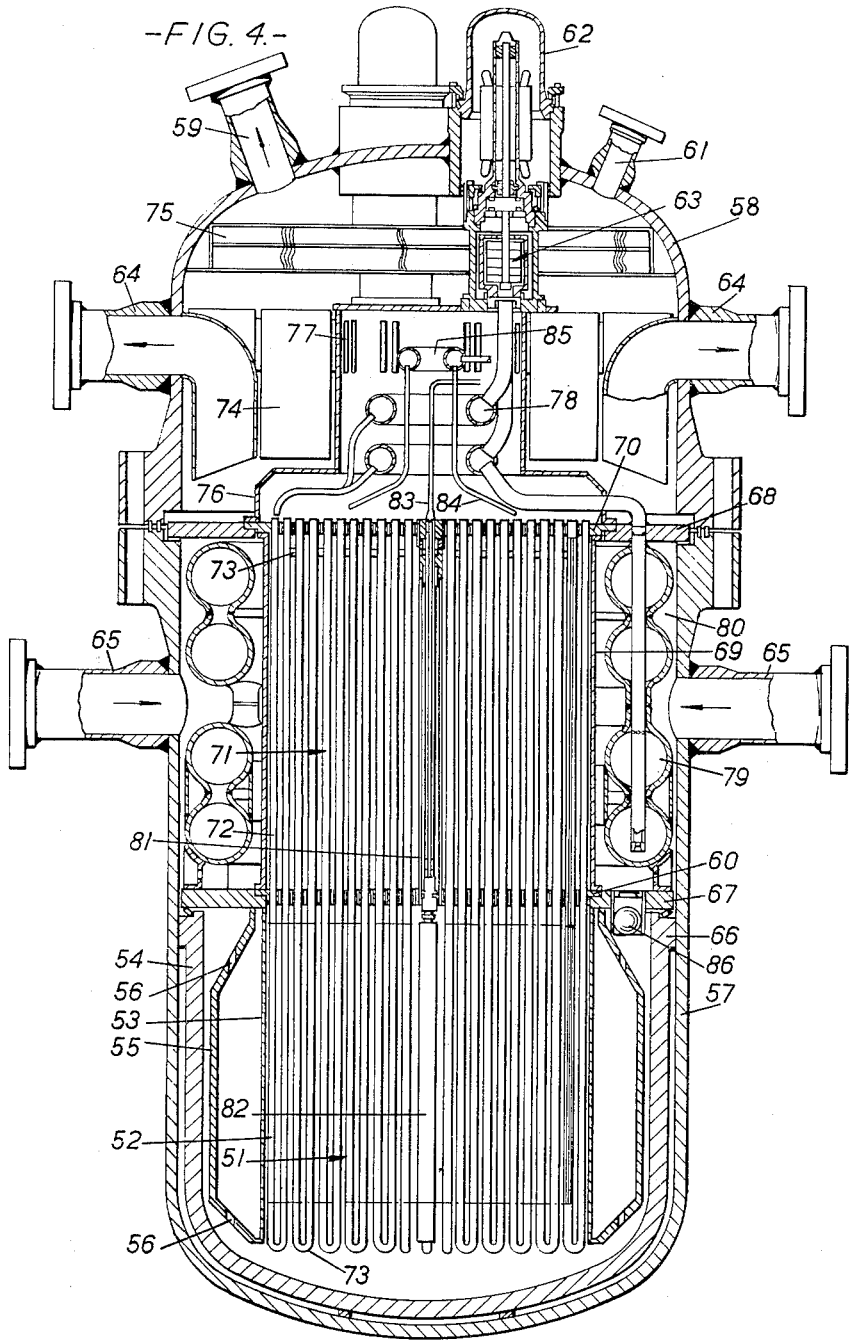

Two nuclear reactors embodying the invention will now be described by way of example with reference to the accompanying drawings in which:

FIGURE 1 shows a vertical section through a first reactor having fuel tubes and extension tubes, FIGURE 2 shows a sectional view of an adjacent pair of fuel tubes with associated extension tubes, FIGURE 3 is a section on the line 3—3 of FIGURE 2, FIGURE 4 shows a vertical section through a second reactor having fuel tubes and extension tubes, and FIGURE 5 shows an enlarged view of the reactor tube assembly.

General assembly of first reactor

The first reactor to be described by way of example with reference to FIGURES 1, 2 and 3, is a boiling water reactor having a biological shield 11 (FIGURE 1) of concrete within which a pressure vessel 12 is supported by framework 13. A cylindrical shell 14 dependent within the vessel 12 bounds a core compartment in which is disposed a core consisting of a bank of tubes 15 containing sheathed fuel elements 16 (FIGS. 2 and 3) as will be described in greater detail subsequently.

Feed water is admitted to the pressure vessel through feed water inlets 18 opening into the vessel externally of the cylindrical shell 14 at points situated slightly below a ring of ports 19 adjacent the upper end of the shell. A proportion of the water which has reached saturation temperature within the cylindrical shell 14 by flow over the tubes 15 is therefore recirculated through the ports 19 and becomes mixed with the incoming feed water. The mixture which constitutes the reactor coolant hereinafter referred to as the secondary coolant flows downwards in the annular space around the cylindrical shell 14, which serves as a downcomer, and after entering the core at the bottom is first heated to saturation temperature and, as it progresses further through the core, becomes evaporated.

The tubes 15 of the core bank are upright and are interconnected by top and bottom reverse U bends, such as 20, to establish radial flow paths of serpentine configuration with long straight runs from a central header 21 to a pair of outer headers 22 each extending in the shape of a semi-circle adjacent the lower edge of the cylindrical shell 14. These flow paths through the tubes define part of a circulation path for an intermediate heat transfer fluid hereinafter referred to as the primary coolant. This circulation path is completed by pipes 23 rising respectively from the outer headers 22 to the inlets of respective circulating pumps 24 and by pipes 25 leading, in a manner not appearing in the drawings, from the pump outlets back to the central header 21. The motors of these circulating pumps are accommodated in pockets 26 formed in the head of the pressure vessel which pockets are closed off by end caps, such as 27.

Each of the limbs of the tubes 15 contains a group 16 of juxtaposed sheathed fuel elements of circular cross section, there being three in the illustrated example of which those appearing in the drawings are denoted 28, 29 and 30 (FIGURE 3). Wound around the sheath of each element is a helical spacing wire 41 across which the diameter is such that the three elements fit snugly in a triangularly arranged bundle in the tube, one being inserted with the wire helix oppositely handed to the other two. Preferably the elements are composed of several sections lengthwise of the tube and measures may be adopted to set adjacent bundles of sections in different angular relationship for the purpose of promoting turbulence in fluid circulated through the tubes and so enhance the heat transfer capabilities of such fluid.

The primary coolant with which the core tubes are charged is pressurized water, preferably of the same quality as the water acting as the reactor coolant, and this pressurized water is therefore present as a circulating heat transfer medium between the sheathed fuel elements and the reactor coolant.

As described up to this point the illustrated reactor is the same as that particularly described in my aforementioned copending U.S. patent application Serial No. 113,-734 to which reference should be made for further details of construction, especially concerning the arrangement by which the pressurized water circuit is surrounded throughout by the reactor coolant.

Assembly of fuel tubes and extension tubes in first reactor

At their upper ends the tubes 15 are extended considerably beyond the upper limit of the fuel contained therein so that each core tube is constituted by a lower fuel tube 15a which houses fuel elements and an upper unfuelled extension tube 15b, these extension tubes being formed with a series of spaced circumferential fins 32 (FIGURE 2). As between adjacent extension tubes the fins are interlaced so that the bank of extension tubes provides above the water level a separator section to separate the steam.

In the extension tube 33 in which the circulating pressurized water rises there is disposed a heat insulator 34 extending over a section of length commencing below the separator section and terminating adjacent the reverse bend 20. If this insulator is of solid material, the material must be chosen for its low neutron absorption and in this instance a thickening of the tube wall, which must also be of a material similar in this respect, such as zirconium, is convenient. Preferably, however, the insulator 34 comprises a thin sleeve supported with clearance within the tube limb co-extensively with the length to be insulated, the annular clearance space between the sleeve and the inner surface of the tube wall being closed at one end so that virtually stationary water becomes trapped in this space. The insulator projects a short length over the fuel tube 15a below the extension tube 33 and over this length of the fuel tube the wire helix on the fuel elements is discontinued as by straightening of the wire into the axial direction, so that with turbulence in the circulating pressurized water thereby reduced the transfer of heat through the tube wall is further suppressed over the insulated section.

The other downcomer extension tube 35 has a section of extended outer surface area commencing adjacent the reverse bend 20 and terminating just short of the separator section. In the illustrated example, this extended area is produced by a number of longitudinal fins 36. Approximately co-extensive with this section is an internal plug 37 leaving an annular channel between itself and the inner surface of the tube wall through which channel the flow velocity of the circulating pressurized water is increased to promote heat transfer further.

Heat transfer between the circulating primary coolant in the extension tube 33 and the secondary coolant being reduced, little heat is given up in passage of the primary coolant to the downcomer extension tube 35. The primary coolant arriving at the start of the tube 35 is heated to its boiling point; indeed a certain degree of evaporation may be permitted in this region, which is outside the nuclear reaction zone so that loss of moderation is of no consequence. Over the longitudinally finned length of the downcomer tube 35 a counter-flow relationship exists between the primary coolant inside the tube and the secondary coolant leaving the separator section as steam outside the tube; consequently the steam on finally leaving the tube bank is superheated to a degree as near as possible to the maximum temperature attained by the primary coolant. The superheated steam passes out of the pressure vessel through outlets, which do not appear in the drawings, and may be fed directly to a steam turbine.

Since only half the number of extension tubes are effective for superheating purposes, a cross-flow component may be desirable in the flow of steam from the separator section in order to ensure that all the steam has adequate contact with those tubes that do effect superheating. To provide this cross-flow component a frustroconical baffle plate 38 is carried at the head of the cylindrical shell 14, the action of this plate being to deflect steam rising in an outer zone of the tube bank towards the centre. A flow component lengthwise of the tubes nevertheless remains. In respect of the tubes in the outer zone, that is to say, beneath the sloping wall surface of the baffle plate 14, the separator section and differential heat transfer arrangement as shown in FIGURE 2 is foreshortened so as to be accommodated below the baffle plate wall.

The upper reverse bends 20 interconnecting the extension tubes are constructed with openings in alignment with the tube limbs so as to permit introduction and withdrawal of the fuel elements. Such openings are closed by detachable plugs 39 between which and the adjacent components in the respective tube limbs extend stems 40 coupled resiliently with the plugs to allow for lengthwise expansions.

The extra height added to the tubes by virtue of the separator and superheater sections makes the plugs readily accessible from the top of the pressure vessel for inspection and cleaning when a change of fuel is being undertaken.

General assembly of second reactor

The second reactor now to be described by way of example with reference to FIGURES 4 and 5 is also a boiling water reactor having a core 51 (FIGURE 4) in which fuel elements are housed in fuel tubes 52 through which pressurised light water is circulated as a primary coolant. The fuel tubes are clustered in a manner to baffle described hereinafter in a core region defined by a baffle 53, this assembly being housed in a pot 54. A secondary coolant, also light water, is circulated downwards through the annular space between the pot and the baffle and upwardly through the core between the fuel tubes. A thermal shield 55, interposed between the baffle and the pot, has apertures 56 to permit downward flow of the secondary coolant. Neutron moderation in the reactor is effected by the primary and secondary coolants.

The reactor is housed in a reactor vessel 57 closed by a dome 58 from which projects a steam pipe 59, three connection 61 for pressure and three casings 62 (of which only two are shown in FIGURE 1) each housing a motor-driven pump 63 for circulating the primary coolant. Also projecting laterally of the dome are two outlets 64 for recirculating unevaporated secondary coolant, whilst projecting laterally of the vessel 57 are two inlets 65 for the recirculating secondary coolant. The pot sits within the lower half of the reactor vessel, being located by a rim 66 surrounding the pot. An intermediate support annulus 67 is supported by the rim 66, and carries an intermediate support plate 60, whilst a top support annulus 68 rests on a shoulder formed at the upper end of the vessel and carries a top support plate 70. The intermediate support annulus and plate, which traverse the reactor vessel, seal the pot. Between the support plates a skirt 69 defines a cylindrical heat transfer region 71 within which are clustered extension tubes 72, each extension tube being a continuation of a fuel tube. The upper ends of the extension tubes and the lower ends of the fuel tubes have interconnections 73 to form parallel paths of serpentine configuration for the primary coolant through series of tubes. The fuel tubes and the extension tubes are suspended from the top support plate and are steadied against vibration and deformation by the intermediate support plate.

Apertures in the support plates permit upward flow of the secondary coolant through the core and the heat transfer region into the dome. In its upward passage the secondary coolant is allowed to boil to form a mixture of steam and water which is separated in the dome by fifteen cyclone steam separators 74 which discharge water to the outlets 64 and steam to scrubber units 75 and thence to the steam outlet 59. A division plate 76, in section similar to a top hat, covers the heat transfer region and funnels the secondary coolant through apertures 77 to the steam separators; the primary circulating pumps are mounted on the division plate.

The primary coolant is collected from and introduced into the paths through the fuel and extension tubes by ring headers 78. The pumps 63 circulate the primary coolant from the upper header 78 to a toroidal pressuriser 79 and thence back to the lower inlet header and the fuel and extension tubes. The pressuriser serves to maintain the pressure of the primary coolant and is situated within the annular space 80 between the skirt and the reactor vessel.

Hollow open-ended shut off rods 81 of neutron absorbing material are housed within the heat transfer region during normal operation of the reactor and drop into the core over guides 82 when it is desired to shut the reactor down. The shut off rods are hydraulically operated, there being an individual connection 83 between nine central control rods (of which one is shown in FIGURE 4) and control apparatus outside the reactor by which these central control rods can be actuated singly or in groups. There are connections 84 between other outer control rods (not shown) and an operating fluid header 85 within the division plate, and a single connection between this header and the control apparatus, so that the outer control rods are actuated in unison.

The recircuated water of the secondary coolant, together with feed water as necessary, is returned to the reactor vessel by the inlets 65 which open into the annular space 80 above the intermediate support annulus 67. Mounted in this intermediate support annulus are twenty-four non-return valves 86 through which the secondary coolant must pass to enter the core pot. These valves have an important safety function.

It is desirable that a reactor fails safe in the event of any conceivable accident. Accordingly care must be taken to ensure that damage to the secondary coolant circuit could not result in the reactor vessel being drained of secondary coolant leaving the fuel tubes dry externally with the risk of over-heating. Should a rupture of the dome occur, the secondary coolant is depressurised and consequently much of this coolant is evaporated; however, it can be shown that sufficient coolant water remains in the core pot to maintain immersion of the greater part of the fuel tubes. On the other hand, should a rupture occur at the inlets 65 it is conceivable that, in the absence of the valves 86, the pressure of steam in the dome could force all the secondary coolant water in the core pot out through the rupture, leaving the fuel tubes dry externally. This possibility is forestalled by the non-return valves 86 which prevent secondary coolant being forced back from the core pot and expelled through the breach.

Assembly of fuel tubes and extension tubes in second reactor

Each fuel tube 52 and its associated extension tube 72 (FIGURE 5) is constituted by an integral length of tubing made from a material of low capture cross section for neutrons, for example a zirconium base alloy such as zirconium with 2½% by weight of niobium; this particular alloy has low neutron capture cross section combined with mechanical strength and corrosion resistance in boiling water. The tubes have an internal diameter of 1.359 inches and are arranged in a square lattice with their centres 1.529 inches apart. This lattice spacing is maintained by the intermediate support plate 60 in which the tubes are slidable and by the top support plate 70 from which the tubes are suspended. To the upper end of each extension tube there is fitted a tubular head 87, the two heads of adjacent tubes having branch interconnections 88. End caps 89 seal the upper ends of the heads and the heads are jointed into the top support plate, for example by sweating or cold pressing; the end caps are of a zirconium base alloy preferably the same as is used for the tubes 52 and 72. At their lower ends the fuel tubes are reduced in diameter and joints between adjacent fuel tubes are made by U bend interconnections 90. Positioned on parallel axes at intervals throughout the tube assembly are shut off rods 81 also suspended from the top support plate; at these positions longer branches 91 interconnect the heads of adjacent extension tubes. The fuel and extension tubes are so interconnected as to provide separate, isolated, serpentine paths for the primary coolant passing through the tube assembly. Apertures 92, 93 in the intermediate and top support plates 60, 70 permit circulation of the secondary coolant upwardly between the fuel and extension tubes whilst also creating some degree of pumping head to suit the characteristics of the secondary coolant circulating means. Within each fuel tube is situated a fuel assembly 94 carried by a stainless steel stem 95 which extends upwardly through the extension tube and is secured at its upper end to the end cap. The stem 95 carries a spider 96 having radial projections to centralise the fuel assembly in the fuel tube. The fuel assembly is also centralised by webs 97 and at its lower end by a fitting 98.

The function of the primary coolant, which is pressurised light water, is to abstract heat from the fuel assemblies and deliver it to the secondary coolant, which is boiling light water. The provision of the extension tubes 72 to constitute an unfuelled heat transfer region directly above the core enables the primary coolant circulated within them to dissipate heat between consecutive back and forth passes through the core. Thus, in its passage through the fuel tubes the primary coolant can abstract more heat from the fuel than it delivers to the secondary coolant, the gain being transferred subsequently to the same secondary coolant, through the extension tubes, before the primary coolant next passes through the core.

As stated above the fuel and extension tubes are connected to provide serpentine paths for the primary coolant flowing through the tubes. These paths are arranged, in a manner described and claimed in copending U.S. patent application Serial No. 238,446 (Potter), filed November 19, 1962, and assigned to the assignee of the instant application to form a cross lattice ensuring that the extra heat produced in the central region of the core with respect to the outer regions is spread over the whole core region as rapidly as possible. With the fuel tubes arranged in a square lattice of side 1.529 inches, as previously mentioned, the connections between adjacent tubes are arranged across the diagonals of the square lattice, so that the greater spacing across these diagonals (2.160 inches) can be used to accommodate U bend interconnections 90 at the lower ends of the fuel tubes. All the inlet and outlet connections to the tube assembly are made to the heads of the extension tubes.

Purely by way of example, the following are design parameters for the second reactor described above:

| | |
|---|---|
| Reactor power | 60 megawatts (heat). |
| Steam horse power | 20,000 H.P. |
| Core diameter | 51 inches. |
| Core active length | 44.35 inches. |
| Fuel tube material | Zr-2½% Nb. |
| Number of fuel tubes | 790. |
| Number of fuel rods per tube | 5. |
| Fuel tube outside diameter | 1.429 inches. |
| Fuel tube inside diameter | 1.359 inches. |
| Fuel tube pitch (square) | 1.529 inches. |
| Clearance between fuel tube and fuel rods | 0.125 inch. |
| Fuel loading | 1.86 tonnes U. |
| Axial form factor | 1.46. |
| Radial form factor | 1.63. |
| Peaking factor | 1.10. |
| Average fuel rating | 32.3 megawatts per tonne U. |
| Peak fuel rating | 84.5 megawatts per tonne U. |
| Average fuel burn-up | 20,000 megawatt days per tonne U. |
| Peak fuel temperature | 1600° C. |
| Number of shut-off rods | 21. |
| Shut off rod inside diameter | 2.784 inches. |
| Shut off rod outside diameter | 3.160 inches. |
| Shut off rod material | 4% Boron/stainless steel. |
| Primary coolant composition | 100% $H_2O$. |
| Primary coolant operating pressure | 2100 p.s.i.a. |
| Primary coolant maximum temperature | 600° F. |
| Primary coolant flowrate | $10^5$ lbs./hr. |
| Primary coolant pumping power | 60 kw. |
| Number of primary coolant circulators | 3. |
| Primary coolant volume | 70 cub. feet. |
| Secondary coolant steam conditions | 665/0.995 p.s.i.a/dryness. |
| Steam output | 227,000 lbs./hr. |
| Secondary coolant feed temperature | 320° F. |
| Secondary coolant circulation rate (core) | $4.1 \times 10^6$ lbs./hr. |
| Secondary coolant pressure at core inlet | 685 p.s.i.a. |
| Secondary coolant pressure drop | 20 p.s.i. |
| Secondary coolant pumping power | 150 kw. |

It is to be understood that the invention is not limited to the details of the foregoing examples. For instance, although the primary and secondary coolants have been described as pressurised and boiling light water, one or both of these coolants may comprise a mixture of light and heavy water; such an arrangement offers the possibility of reactor control and extension of core life by varying the ratio of light to heavy water in the coolant. Furthermore, the fuel tubes and extension tubes need not be integral; in a reactor embodying the present invention the fuel tubes might be of zirconium whilst the extension tubes might be of some cheaper material or some material affording better thermal conductivity. Since the extension tubes are outside the core region this material such as stainless steel may have a greater neutron absorption cross section.

Furthermore, in the foregoing examples the primary coolant is pressurised to prevent bulk boiling which could result in a substantial reduction in the density of the primary coolant with a consequent reduction in the moderating power of the primary coolant. However, the rate of heat transfer between the primary and secondary coolant is increased if there is some turbulence in the primary coolant. Advantageously, therefore, the primary coolant is maintained at such a pressure that some steam is formed in it, the steam bubbles causing turbulence in the primary coolant and thus increasing the heat transfer rate.

What I claim is:

1. In a nuclear reactor, a plurality of fuel elements, a plurality of fuel tubes housing the fuel elements, an unfuelled extension tube connected in series with each fuel tube, passage means for circulating a liquid neutron-moderating primary coolant through said fuel and extension tubes, and means for passing a secondary coolant over the outer wall surfaces of said fuel and extension tubes, substantially the entire outer wall surfaces of said fuel and extension tubes being exposed to said secondary coolant for heat transfer from the primary coolant to the secondary coolant.

2. A nuclear reactor comprising fuel elements, fuel tubes housing the fuel elements, passage means for circulating a liquid neutron-moderating primary coolant through the fuel tubes, means for passing a secondary coolant over the outer wall surfaces of the fuel tubes in heat transfer relationship through the tubes with the primary coolant therein, an unfuelled extension tube connected in series with each fuel tube and also exposed to the secondary coolant for heat transfer between the primary coolant circulating through the extension tube and the secondary coolant, and end passage connections between adjacent fuel tubes and between adjacent extension tubes to provide for the primary coolant a circulation path having fuelled sections alternating with unfuelled sections whereby, in passage through the fuelled sections, the primary coolant can take more heat from the fuel elements than is transferred from the fuelled sections to the secondary coolant while, in passage through the unfuelled sections, the primary coolant is cooled in readiness for passage through the fuelled sections, substantially the entire outer wall surfaces of said fuel and extension tubes being exposed to said secondary coolant.

3. A nuclear reactor as claimed in claim 2 wherein each fuel tube and its associated extension tube are constituted by a continuous core tube having a fuelled section and an unfuelled section.

4. A nuclear reactor comprising fuel elements, fuel tubes housing the fuel elements, passage means for circulating a neturon-moderating primary coolant through the fuel tubes, means for passing a secondary coolant over the outer wall surfaces of the fuel tubes in heat transfer relationship through the tubes with the primary coolant therein, an unfuelled extension tube connected in series with each fuel tube and also exposed to the secondary coolant for heat transfer between the primary coolant circulating through the extension tube and the secondary coolant, and interconnections between the fuel tubes and between the extension tubes to provide a circulation path for the primary coolant of which the thermal energy gained from the fuel elements is removed by the secondary coolant, the circulation path having fuelled sections alternating with unfuelled sections, substantially the entire outer wall surfaces of said fuel and extension tubes being exposed to said secondary coolant.

5. A nuclear reactor comprising fuel elements, fuel tubes housing the fuel elements and clustered in upright relationship to group the fuel elements in a reactor core configuration, passage means for circulating a primary coolant through the fuel tubes, means for passing a secondary coolant over the outer wall surfaces of the fuel tubes in heat transfer relationship through the tubes with the primary coolant circulating therein, an unfuelled extension tube forming in respect of each fuel tube an upward straight extension projecting above said core configuration with its exterior exposed to the secondary coolant for heat transfer between primary coolant circulating in the extension tube and the secondary coolant, and passage connections between adjacent extension tubes and between adjacent fuel tubes to provide a circulation path for the primary coolant of which the thermal energy gained from the fuel elements is removed by the secondary coolant, the circuation path having fuelled sections alternating with unfuelled sections, whereby in passage through the fuelled sections the primary coolant can take more heat from the fuel elements than is transferred from the fuelled sections to the secondary coolant, substantially the entire outer wall surfaces of said fuel and extension tubes being exposed to said secondary coolant.

6. A nuclear reactor comprising fuel elements, fuel tubes housing the fuel elements, passage means for circulating a primary coolant through the fuel tubes, means for passing a secondary coolant unidirectionally over the outer wall surfaces of the fuel tubes in heat transfer relationship with the primary coolant circulating therein, an unfuelled extension tube connected in series with each fuel tube and also exposed to the secondary coolant for heat transfer between the primary coolant circulating in the extension tube and the secondary coolant, passage connections between adjacent extension tubes and between adjacent fuel tubes to provide a circulation path for the primary coolant to flow through one fuel tube and its associated extension tube in a similar directioon to the flow of the secondary coolant and then to flow through an adjacent extension tube and its associated fuel tube in a direction opposed to the flow of the secondary coolant, and means carried by said extension tubes for reducing the heat transfer between the primary coolant in the extension tubes and the secondary coolant where the coolants are flowing in similar directions and for increasing the heat transfer where the coolants are flowing in opposite directions.

7. A nuclear reactor as recited in claim 6 wherein said last mentioned means comprises means forming variations in the internal cross-sectional area of the extension tubes to cause a differential rate of flow of the primary coolant in the extension tubes and thus a differential rate of heat transfer from the extension tubes.

8. A nuclear reactor as recited in claim 6 wherein said last mentioned means comprises heat insulating means fitted to the extension tube through which the primary coolant flows in a direction similar to the direction of the secondary coolant flow.

9. A nuclear reactor as recited in claim 6 wherein said last mentioned means comprises means for extending the surface area of the extension tube through which the primary coolant flows in a direction opposed to the secondary coolant flow so as to promote heat transfer between the two coolants.

10. A nuclear reactor comprising a vessel defining a space, means for circulating a secondary coolant in said space, a plurality of fuel elements, a plurality of fuel tubes housing the fuel elements and arranged within said space to group the elements in a reactive core configuration, passage means for circulating a primary coolant within the fuel tubes in heat transfer relationship through the tubes with the secondary coolant, an unfuelled extension tube connected in series with each fuel tube, and interconnections between each fuel tube and an adjacent fuel tube and between each extension tube and an adjacent extension tube to define a closed circuit disposed wholly within said space for the circulation of the primary coolant separately from the secondary coolant, substantially the entire outer wall surfaces of said fuel and extension tubes being exposed to said secondary coolant.

11. A boiling water nuclear reactor comprising a plurality of fuel elements, a plurality of fuel tubes housing the fuel elements, means for circulating pressurized water through the fuel tubes as a primary coolant, means for passing a secondary coolant over the outside surfaces of said fuel tubes in heat transfer relationship through the fuel tubes with the primary coolant therein, said secondary coolant being boiling water, and an unfuelled extension tube connected in series with each fuel tube and being also exposed to the secondary coolant for heat transfer between the primary coolant circulating in the extension tube and the secondary coolant, substantially the entire outer wall surfaces of said fuel and extension tubes being exposed to said secondary coolant.

12. A boiling water nuclear reactor comprising a plurality of fuel elements, a plurality of fuel tubes housing the fuel elements, passage means for circulating a primary water coolant within the fuel tubes, means for passing a secondary water coolant over the outside surfaces of the fuel tubes in heat transfer relationship through the fuel tubes with the primary coolant circulating therein, an unfuelled extension tube connected in series with each fuel tube and also exposed to the secondary coolant for heat transfer between the primary coolant circulating in the extension tube and the secondary coolant, end connections between adjacent fuel tubes to provide for the primary coolant a circulation path having fuelled sections alternating with unfuelled sections, whereby in passage through fuelled sections the primary coolant can take more heat from the fuel elements than is transferred from the fuelled sections to the secondary coolant, and means for pressurizing the primary coolant in the primary coolant circulation path, substantailly the entire outer wall surfaces of said fuel and extension tubes being exposed to said secondary coolant.

13. A boiling water nucelar reactor as claimed in claim 12 wherein each fuel tube and its associated extension tube are constituted by a continuous core tube having a fuelled section and an unfuelled section.

14. A boiling water nuclear reactor comprising a plurality of fuel elements, a plurality of fuel tubes housing the fuel elements, passage means for circulating a primary water coolant through the fuel tubes, means for passing a secondary water coolant over the outside surfaces of the fuel tubes in heat transfer relationship through the tubes with the primary coolant circulating therein, an unfuelled extension tube connected in series with each fuel tube and being exposed externally to the secondary coolant for heat transfer between primary coolant circulating in the extension tubes and the secondary coolant, interconnecting passage means establishing through the fuel tubes and their extension tubes a circuit for circulation of the primary coolant separately from the secondary coolant, and means in said circuit for pressurizing the primary coolant, substantially the entire outer wall surfaces of said fuel and extension tubes being exposed to said secondary coolant.

15. A boiling water nuclear reactor comprising a plurality of fuel elements, a plurality of fuel tubes housing the fuel elements and clustered in upright parallel relationship to group the fuel elements in a reactive core configuration, passage means for circulating a primary water coolant through the fuel tubes, means for passing a secondary water coolant over the outer surfaces of the fuel tubes in heat transfer relationship through the tubes with the primary coolant circulating therein, an unfuelled extension tube forming in respect of each fuel tube an upward straight extension projecting above said core configuration with its exterior exposed to the secondary coolant for heat transfer between primary coolant circulating in the extension tube and the secondary coolant, connections between adjacent extension tubes and between adjacent fuel tubes to provide for the primary coolant a circulation path having fuelled sections represented by the fuel tubes alternating with unfuelled sections represented by the extension tubes, and means in communication with said circulation path for pressurizing the primary coolant, substantially the entire outer wall surfaces of said fuel and extension tubes being exposed to said secondary coolant.

16. In a boiling water nuclear reactor, the combination comprising a plurality of fuel elements, a plurality of fuel tubes housing the fuel elements, means for circulating pressurized water through the fuel tubes as a primary coolant, means for passing a secondary coolant unidirectionally over the outer surfaces of said fuel tubes in heat transfer relationship with the primary coolant circulating therein, said secondary coolant comprising boiling water, an extension tube connected in series with each fuel tube and also being exposed to the secondary coolant for heat transfer between the primary coolant circulating in the extension tube and the secondary coolant, and passage connections between adjacent extension tubes and between adjacent fuel tubes to provide a circulation path for the primary coolant to flow through one fuel tube and its associated extension tube in a direction similar to the direction of flow of the secondary coolant and then to flow through an adjacent extension tube and its associated fuel tube in a direction opposed to the flow of the secondary coolant, said extension tubes having similar heat transfer properties so that the primary coolant is cooled in the extension tubes by heat transfer to the secondary coolant first while the primary coolant is flowing in a direction similar to the direction of the secondary coolant and then while the primary coolant is flowing in a direction opposed to the flow of the secondary coolant, substantially the entire outer wall surfaces of said fuel and extension tubes being exposed to said secondary coolant.

17. A boiling water nuclear reactor comprising a plurality of fuel elements, a plurality of upright fuel tubes housing said fuel elements, means for circulating pressurized water through said fuel tubes as a primary coolant, means for passing a secondary coolant upwardly over the outer surfaces of said fuel tubes in heat transfer relationship with the primary coolant circulating therein, said secondary coolant comprising boiling water, an upright extension tube connected in series with the upper end of each fuel tube, passage connections between adjacent extension tubes and between adjacent fuel tubes to provide a circulation path for the primary coolant to flow upwards through one fuel tube and its associated extension tube and then to flow downwardly through an adjacent extension tube and its associated fuel tube, the extension tubes being unfuelled and being immersed in the secondary coolant, means carried by said extension tubes for reducing heat transfer between the primary coolant in the extension tubes and the secondary coolant in the areas where the primary coolant flows upwardly in a similar direction to the secondary coolant and for increasing said heat transfer in the areas where the primary coolant flows downwardly in opposition to the flow of the secondary coolant, and a steam separator in the stream of secondary coolant to separate steam from the boiling secondary coolant so that the secondary coolant in which the extension tubes are immersed is in the form of rising steam which is superheated by heat transfer with downcoming primary coolant in the extension tubes, substantially the entire outer wall surfaces of said fuel and extension tubes being exposed to said secondary coolant.

18. A boiling water nuclear reactor as claimed in claim 17 wherein said fuel elements have external projections which space the elements and cause turbulence in the primary coolant flow.

References Cited by the Examiner

UNITED STATES PATENTS

| | | | |
|---|---|---|---|
| 2,958,637 | 11/60 | Voorhees | 176—39 |
| 3,036,965 | 5/62 | Braun | 176—56 |
| 3,041,264 | 6/62 | Ricard | 176—54 |

FOREIGN PATENTS 1,239,599  7/60  France.

CARL D. QUARFORTH, *Primary Examiner.*
REUBEN EPSTEIN, *Examiner.*